Feb. 22, 1938.  L. G. LARSEN  2,109,356
SLOTTING MACHINE
Filed March 16, 1937  3 Sheets-Sheet 2
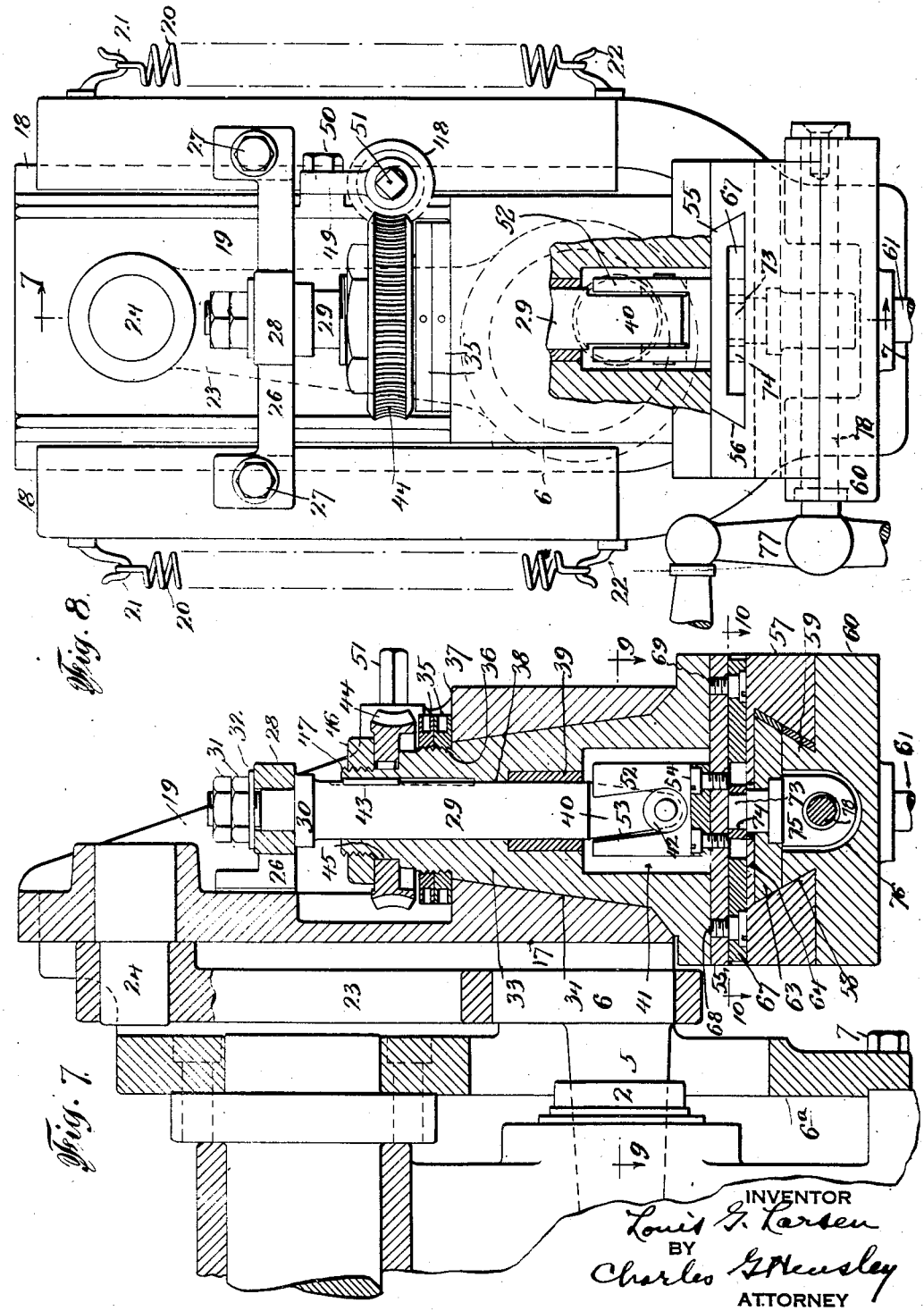
INVENTOR
Louis G. Larsen
BY
Charles G. Hensley
ATTORNEY

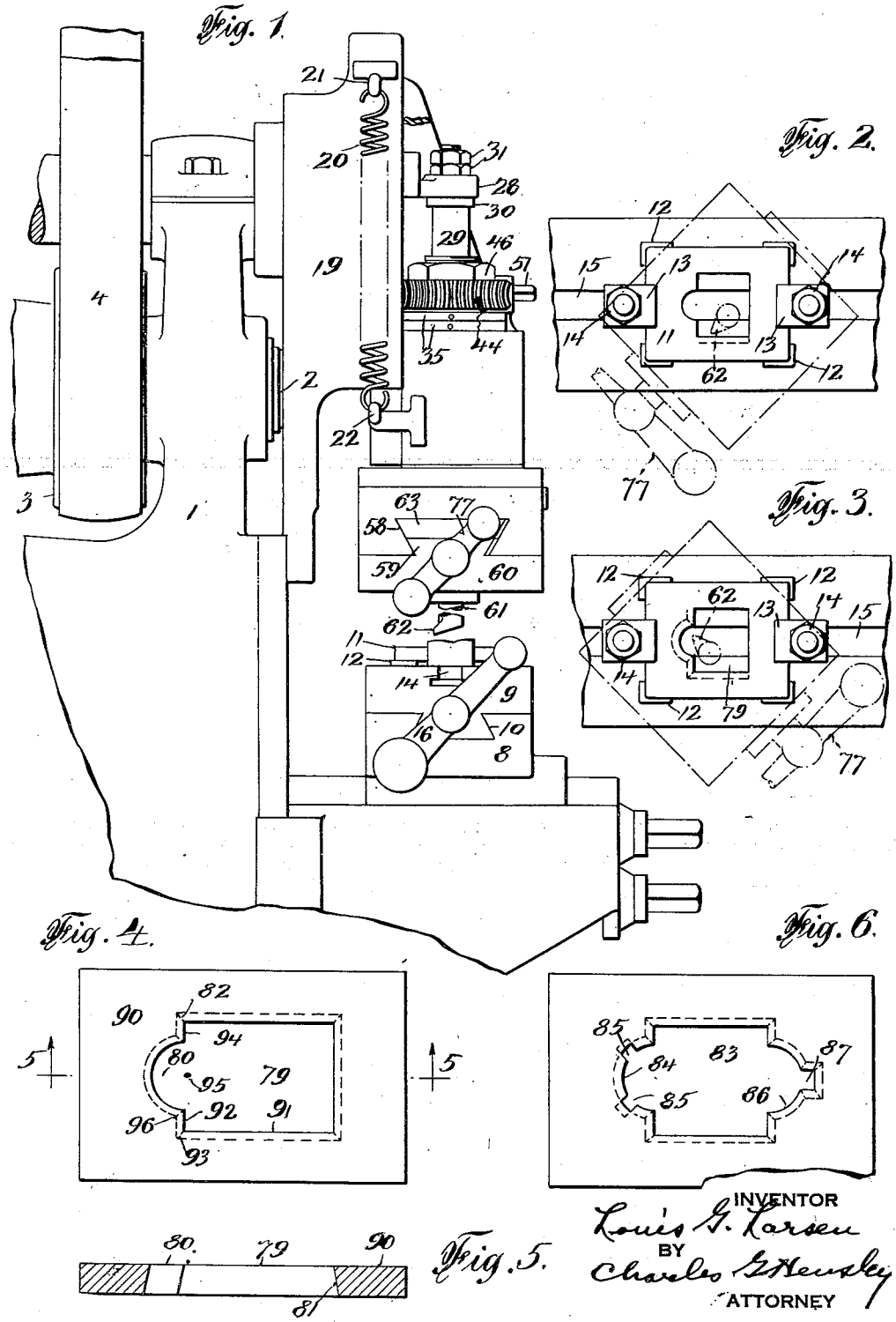

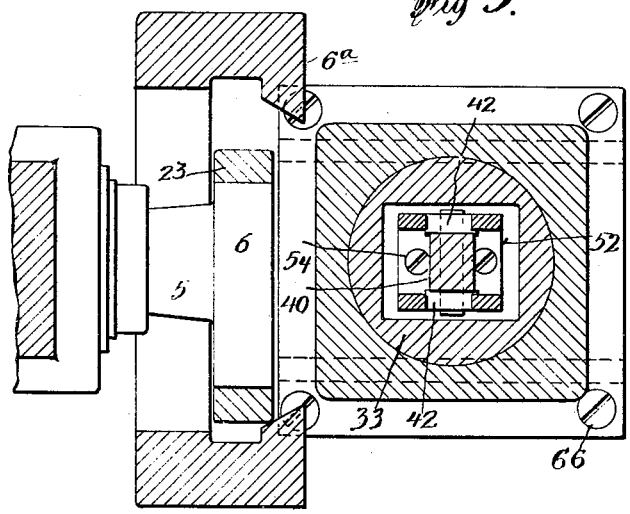
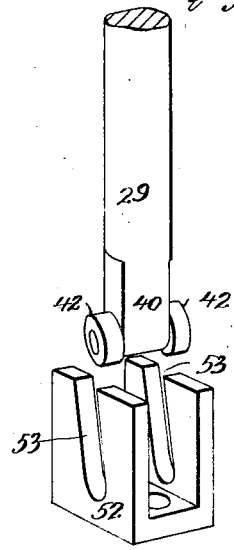
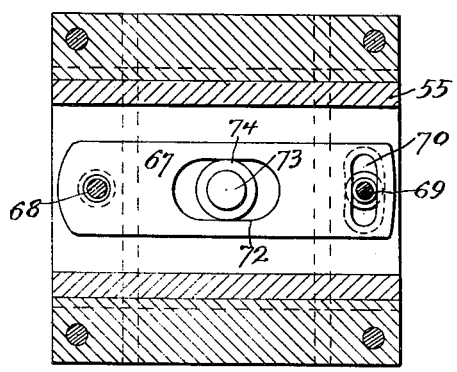
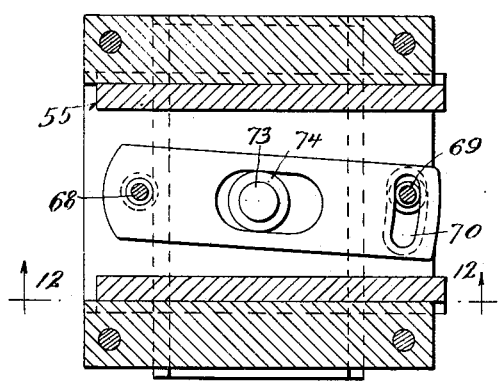
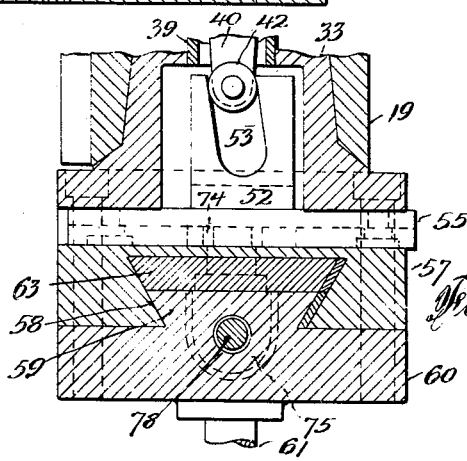
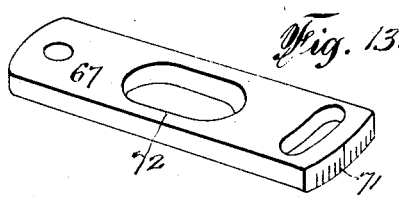

Patented Feb. 22, 1938

2,109,356

UNITED STATES PATENT OFFICE 2,109,356

SLOTTING MACHINE

Louis G. Larsen, Jersey City, N. J., assignor, by direct and mesne assignments, to Wirthsen Associates, Inc., New York, N. Y., a corporation of New York Application March 16, 1937, Serial No. 131,114

23 Claims. (Cl. 90—44)

My invention relates to slotting machines and it is more or less in the nature of a shaper. While not limited to a particular use, it is especially adapted for slotting plates or blocks of metal from which dies are made. There are several main objects to my invention and while some of the features may be segregated and used separately, nevertheless, when combined, they form a slotting machine capable of slotting any type of plate or block of metal to form a blanking die and which will eliminate all hand work in the operation.

Different types of slotting machines have been made for slotting plates which are to form blanking dies, which machines are capable of forming various rectangular slots with the edges cut at an angle to provide clearance when the article is used as a stamping die; but in all machines known to me it has been necessary to form the bevel or clearance in the plate or block of metal at the corners by hand work after the straight cuts were made. With the present machine it is possible not only to cut the rectangular portions of the slot or opening in the piece of work, but it is also possible to cut out the corners where two angular sides meet or where a curve and an angular side meet, so that the necessity of forming this portion of the work by hand is entirely eliminated, thereby saving considerable hand labor and the incident expense in the making of dies.

Another object of my invention is to make it possible to form curved portions on various arcs and of various shapes in a piece of work, without having to provide a circular table, which has been the only means in prior machines permitting this arcuate and circular work to be performed. The circular table referred to was expensive and clumsy, whereas in the present machine the means for making arcuate and circular cuts is very simple and compact, as well as inexpensive in construction.

In slotting machines as heretofore made, wherein provision was made for cutting the edges of slots at an angle for clearance purposes, the head of the machine was tilted at an angle, whereas in the present machine the head reciprocates vertically, but the tool carrier is made to move at an angle to the vertical in order to form the undercut slot in the work.

Under my invention a device may be made to be applied to ordinary milling machines of the types now in common use, thereby converting the machines to embody the features of my invention, or the whole machine may be specially constructed to embody the features of my invention.

Other features and advantages will be set forth more in detail in the following description of my invention.

In the drawings forming part of this application,

Figure 1 is a side elevation of a slotting machine in which my invention is incorporated, only those parts of the machine being illustrated which require modification for the embodiment of my invention, Figure 2 is a plan view looking down on the work holder slide of the machine and showing in dotted lines one position of the tool holder in relation thereto, Figure 3 is a similar view with the tool holder turned to a different position for making a different cut in the work, Figure 4 is a plan view illustrating one type of slot which may be formed in the work with the present invention, Figure 5 is a sectional view taken on the line 5—5 of Figure 4, Figure 6 is a plan view showing another type of slot which may be made in a piece of stock by the use of the present invention, Figure 7 is a vertical, sectional view through the reciprocating head of the machine and it is taken on the line 7—7 of Figure 8.

Figure 8 is a front elevation of the principal parts of the machine which embody my invention, with some of the parts broken away to show the interior construction, Figure 9 is a sectional view taken on the line 9—9 of Figure 7, Figure 10 is a sectional view taken on the line 10—10 of Figure 7, Figure 11 is a similar view but with the parts in a different position to that shown in Figure 10, Figure 12 is a sectional view taken on the line 12—12 of Figure 11, Figure 13 is a perspective view of an adjustable cam plate, and Figure 14 is a perspective view of the parts which cause the reciprocation of one of the slides in the head of the machine.

In the drawings I have shown only part of the complete slotting machine and it is to be understood that such parts as are omitted from the drawings may be the same as the corresponding parts of an ordinary milling machine. In the drawings I have shown a standard 1 of a well known type of milling machine and in this standard there is journaled the spindle 2 of a milling machine which is provided with a pulley 3 which is operated by a belt 4 from any source of power (not shown). This spindle has the usual tapered bore to receive therein the tapered stem 5 carried by an eccentric 6 which is adapted to operate the rising and falling head of my attachment. I prefer to mount upon the frame of the machine the stationary head 6a by means of bolts 7 which head acts as a guide for the reciprocating head. The stationary head is a new or additional part, added to the machine to incorporate my invention therein.

On the front bed of the machine I have shown a slide 8 of usual form which is adapted to move laterally or front to rear of the machine and it is a common part of an ordinary milling machine. On this slide there is mounted a second slide 9 which through the dovetail connection 10 with the slide 8 is adapted to move lengthwise of the machine, and it corresponds with one of the ordinary slides of a milling machine. The piece of work 11 shown in Figures 1, 2 and 3 is clamped to this second or compound slide 9 preferably by being placed between the angular gauges 12 carried by the slide 9 the work being held by clamps 13 having an overlapping engagement with the top side of the piece of work, and being held upon the slide 9 by means of the bolts 14 which are adjustable along the key slots 15 to permit the clamps to be applied to different sizes and shapes of pieces of work to be held upon the slide 9.

The slides 8, 9 with the piece of work carried thereby, are adapted to be shifted at right angles to each other by means of the usual screw feed devices, such as the crank 16 which serves to move the slide 9. These slides for holding the work may, and preferably are, in all respects like the usual slides employed in milling machines for holding and advancing the work, either forward or backwards of the machine, or lengthwise thereof, according to the feed of the stock in relation to the milling tool.

In addition to the fixed or stationary head 6 I have shown a reciprocating head 17 which as shown at 18 has a pair of dovetail guiding portions fitting in corresponding grooves in the forwardly extending portion 19 of the fixed head, so that the reciprocating head may move up and down in a vertical direction; but in the present machine this reciprocating head does not have to be tilted in order to get the undercutting action referred to hereinafter or, in other words, it may reciprocate in a true vertical line. In order to counterbalance a portion or all of the weight of the reciprocating head, I prefer to provide coiled springs 20 each having its upper end secured to a hook 21 on the stationary head, and each having its lower end attached to a hook 22 on the reciprocating head, so that part or all of the weight of the reciprocating head is carried by these springs to counterbalance the reciprocating head.

On one end of the tapered stem 5 there is carried an eccentric 6 which fits in a circular aperture in the lower end of a link or pitman 23 and the upper end of this pitman is mounted on a stud 24 carried by the reciprocating head, so that as the eccentric revolves with the spindle of the machine the reciprocating head is caused to move up and down in a vertical path as determined by the guidance of the members 18 in the dovetail grooves of the stationary head. This up and down reciprocating motion of the movable head is the one which causes the tool to cut through the piece of work as will be more fully hereinafter explained.

There is a bracket 26 shown as mounted on the front of the reciprocating head by the bolts 27 and at the middle of this bracket there is a bearing member 28 in which engages the upper end of a post 29 which is vertically disposed, the post being held in the bearing member 28 in a fixed position as far as vertical movement is concerned, by reason of the engagement of the shoulder 30 of this post, with the under side of the bearing portion 28 of the bracket 26 and by the nut and lock nut 31 which engage the washer 32 which rests on the top side of the bearing member 28, these nuts being threaded onto a reduced end of the post 29.

While the post cannot move up and down, it is nevertheless free to revolve in the bearing member 28 for a purpose to be described. There is a revolvable member 33 which is shown as of tapered construction and fitting into a tapered bore 34 in the lower portion of the reciprocating head. This revolvable and tapered member is revolvable in the lower end of the reciprocating head and it is held in place by lock nuts 35 which are threaded onto a straight portion 36 of the revolvable member, these nuts supporting the revolvable member by resting upon the shoulder 37 of the reciprocating head.

The central post 29 extends down through the bore 38 of the revolving member, and it passes through a sleeve 39 forming a hard bearing for the post. The lower end of the post is provided with a projection 40 which projects downwardly into an enlarged opening 41 in the central portion of the revolvable member 33 and this projection carries a pair of idler rollers 42 as more clearly seen in Figure 14. The post 29 is keyed to the revolvable member 33 by means of the key and slot 43 so that the post and the revolvable member must turn together on their common axis; and the member 33 may reciprocate with the reciprocating head in relation to the post, which latter as above stated, is mounted on the bracket 26 and therefore does not reciprocate vertically.

There is a worm wheel 44 fitting around the reduced portion 45 near the upper end of the revolvable member 33 and this worm wheel is pinned to the revolvable member so that when the worm wheel is turned the revolvable member is caused to turn either right or left, in accordance with the movements of the worm wheel. The worm wheel is shown as being attached to the revolvable member by means of a nut 46 threaded on the portion 47 of the revolvable member.

There is a worm 48 shown as mounted in a bracket 49 attached to the reciprocating head by the bolt 50 and this worm meshes with and operates the worm wheel 44 which carries with it the revolvable member 33. The end of the shaft of the worm is shown as being squared at 51 to receive a wrench or wheel or other member to be manually turned to index the position of the revolvable member 33. This adjustment may take place even while the reciprocating head is in operation and it will be obvious that it may take place while the head is at rest.

Within the opening 41 of the revolvable member 33 there is disposed a cam block 52 which has the two slots 53 extending or pitched at a slight angle to the vertical axis of the post 29; and the two rollers 42 engage in these slots and travel therein so that the cam block 52, which reciprocates with the reciprocating head, is given a slight lateral movement by the rollers 42 which are carried by the non-reciprocating post 29. This movement is to cause the lateral movement of the tool which produces the undercut motion on the piece of work and for most purposes the angle of the slots 53 may be 5° in relation to the axis of the post, although I do not intend to limit my invention to any specific measurements.

The cam block 52 is bolted by means of the screws 54 to a sliding plate 55 which fits against the bottom surface of the revolvable member 33 and the side edges of this plate are dovetailed as shown at 56 in order to have a dovetail connection with the sliding member 57 which is also carried by the revolvable member 33. The lateral motion imparted to the sliding plate 55 by the action of the rollers 42 on the inclined slots 53 in the cam block causes the sliding plate 55 to move a slight extent, which, with the parts in the position shown in Figures 7 and 8, will be front to back of the machine, the plate 55 sliding in the dovetailed slot 56 of the member 57.

The block 57 which is connected to the lower end of the revolvable member is itself provided with a dovetailed groove 58 extending in Figures 7 and 8 lengthwise of the machine, and in the lower portion of which groove engages the dovetailed projection 59 of the sliding member 60. On the under side of this slide 60 which is adapted to slide longitudinally of the machine in relation to the block 57 there is mounted the tool carrier 61 which is adapted to carry a cutting tool 62 which is to perform the slotting operation on the piece of work. In the upper half of the dovetailed groove 58 there is mounted a slide 63 which is adapted to move lengthwise of the machine in the dovetailed groove 58 so that it is held in the dovetailed groove while being permitted to reciprocate longitudinally of the machine.

Between the sliding plate 55 and the block 57 I have mounted a cam plate 67 shown in perspective in Figure 13. One end of this cam plate is pivotally mounted by means of the pin 68 on the slide 55 and the opposite end of this cam plate is clamped by means of a bolt 69 also to the slide 55 but this bolt passes through a slot 70 of arcuate shape, the slot being struck on an arc the center of which is the center of the pin 68.

One end of the cam plate 67 may be provided with a scale 71 to index the position of the cam plate. In the center portion of this cam plate there is a slot 72 of elongated shape which, when the plate is indexed at zero position, extends at right angles to the axis of the stationary post 29 and parallel with the longitudinal line of the machine.

There is a post 73 mounted centrally in the slide 63 and on the upper end of this post there is an antifriction roller 74 which lies between the sliding plate 55 and the block 57 and it also lies in the slot 72 of the cam plate 67. The slide 63 has a downwardly extending projection 75 which travels freely in the groove or depression 76 in the bottom slide 60. The crank 77 is attached to a threaded shaft 78 which extends through and has a threaded connection with the projection 75 so that by turning the crank 77 the bottom slide 60, which carries the tool holder, may be moved laterally of the axis of the vertical post 29 for the purpose of moving the point of the tool away from this axis for a purpose to be set forth hereinafter.

In Figures 4 and 6 I have shown examples of the kind of work which can be executed with the present machine and in Figure 5 I have shown a longitudinal section of the piece of work shown in Figure 4 to indicate the undercut. In Figure 4 I have shown a rectangular opening 79 to be cut in the piece of work with a semicircular extension 80 at one end of the rectangular opening. The dotted line around the opening indicates the undercut made by the tool corresponding with the undercut 81 in Figure 5. In performing the operation the tool moves downwardly to pass through the work and it is also given a lateral movement to form the undercut. This is not per se new but heretofore it has not been possible to form the undercut at the corners 82 except by hand, and it has not been possible to form the undercut at the circular portion 80 of the opening except by employing a revolvable table, whereas these several operations may all be executed by the present machine.

In Figure 6 I have shown a piece of work with the main opening or slot 83 of the general shape of a rectangle with an arcuate extension 84 at one end and from this arcuate edge extend outward radial slots 85. All of these may be cut with the present machine. At the opposite end of the work I have shown an arcuate extension 86 and from these extend a radial and rectangular slot 87. These parts may all be cut with the present machine.

*Operation*

When the spindle is set into operation the reciprocating head will reciprocate vertically in relation to the stationary head, the former being guided by the dovetail connection 18 between the reciprocating and stationary heads and the stroke will be determined by the character of the eccentric 6. In most cases a stroke of say two inches will be sufficient for all sorts of work, although the machine is not limited to a stroke of a particular extent. As the head reciprocates the revolvable member 33 reciprocates with it and all of the parts carried by the reciprocating head, including the tool holder and tool, also reciprocate with the head, but the central post 29 does not reciprocate vertically although it may revolve with the revolvable member 33.

At each reciprocation of the reciprocating head the rollers 42 acting on the sliding surfaces of the grooves 53 of the cam block 52, due to the up and down movement of the reciprocating head, causes a lateral movement of the sliding plate 55 because the cam block is attached to this sliding plate, so that as the cam block is reciprocated the slide 55 moves with it. With the parts shown in the position indicated in Figures 7 and 8 the slide 55 will reciprocate right and left in Figure 7, or front to back of the machine. As the plate 55 reciprocates in its own plane it carries the cam plate 67 with it since the latter is attached to it.

If the cam plate 67 is indexed to a position on either side of the zero point on the scale 71 the slot 72 of this plate will be inclined or placed at an angle to the direction of movement of the plate 55 the angle of inclination being indicated on the scale 71. This setting of the cam plate 67 is caused by slacking off the screw 69 and moving the cam plate to the right or left to the desired degree indicated on the scale 71, after which the screw 69 is tightened and the machine is then set for cutting a given degree of undercut as shown at 81 in Figure 5.

This setting of the cam plate 67 is performed before the operation of the machine is started and usually it will not be necessary to alter the setting of this plate during the slotting of a particular piece of work except for reversing the direction of the undercut. As the sliding plate 55 is moved laterally by the action of the rollers 42 on the cam block 52 the cam plate 67 moves with the sliding plate in relation to the roller 74 on the post 73 and the side edges of the cam slot 72 act on the roller and therefore on the post to cause a slight movement of the slide 63 in the dovetail slot 58 of the block 57.

The lower slide 60 is connected with the slide 57 through the screw shaft 78 and therefore the lower slide 60 partakes of this slight movement. This movement takes place at each reciprocation of the vertically moving head; and as the tool is carried by the tool holder 61 on the slide 60 the tool itself is given a slight movement laterally while it is making its up and down stroke and it is this movement which produces the undercut or angular cut as shown at 81 in the piece of work in Figure 5. In most cases this undercut angle will be somewheres between 1° and 5° which is sufficient clearance for most dies.

The piece of work 90 which is to be slotted is mounted within the angle pieces 12 on the compound slide rest 9 where it is held by the clamps 13 secured by the bolts 14. Let it be assumed that the piece of work to be slotted is to be shaped like that shown in Figure 4. It is understood that a hole or a number of holes will be bored through the piece of work in order to provide an opening for the tool to start operations. Sometimes a die maker will drill a great many holes within the range of the slot to be formed so that the tool will have a small amount of metal to remove. However, the only definite requirement is that at least one hole be made for the tool to make its first strokes therethrough.

The slide 8 and the compound slide 9 may be adjusted to bring the piece of work in correct relation to the tool. The machine may be set into operation so that the sliding head reciprocates in a vertical direction under the action of the eccentric 6. Let it be assumed that the tool first makes a cut along the edge 91. While making this cut the point of the tool will be directed at right angles to the direction of the edge 91. As the head reciprocates, the tool will make rapid vertical strokes with the sliding head and the slide 8 will be moved crosswise of the machine or front and back, so that the tool cuts along the line 91.

During the vertical strokes made by the sliding head the rollers 42 on the stationary posts 40 act on the slanting edges of the slots 53 to move the cam block 52 laterally. As this block is carried by the sliding plate 55 the latter is reciprocated in its own plane and in the slot 56. This plate carries the cam plate 67 and the edges of the slot 72 act on the roller 74 which is mounted on the post 73. As this post is itself mounted in the slide 63 the latter reciprocates a slight extent in the dovetail groove 58 of the block 57. The slide 60 which carries the tool holder 61 and therefore the tool, is connected with the slide 63 through the projection 75 and the shaft 78, so that the slide 60 partakes of the lateral movement caused by the cam plate 67.

The tool is making vertical strokes along the bottom line 91 in the piece of work; the cam plate 67 will have been so indexed in relation to the scale 71 that as the tool makes the up and down movement with the vertical sliding head, the tool moves laterally with the slide 60 and in a downward direction in Figures 2, 3 and 4, so that the tool, instead of moving only in a vertical direction, also moves downwardly to produce the cut in the work to form the angle 81 which is the clearance angle in the piece of work.

When the cutting operation proceeds to the position where the vertical line 92 is to be cut, the revolving member 33 will be indexed, that is to say, the shaft of the worm 48 will be turned by applying a crank or handle to the end 51 of the shaft and turning it, and the worm will act on the worm gear to turn the latter, and this will revolve the member 33. As the tool holder 61 is carried by the member 33 then the indexing of the latter member will turn the tool holder around its own axis so that the point of the tool will be brought to a position, which will be 90° from the angle at which the straight portion 91 of the slot was cut. When the member 33 is indexed as just described, the post 29 will turn with it because of the key and slot 43, so that the projection 40 on the lower end of the post and the wheels 42 will be turned simultaneously with the member 33.

In the new position of the several parts the direction of the lateral motion imparted through the rollers 53 to the cam block 52 will be changed in direction so that the direction of motion of the slide 55 and the several parts operated by it down to the slide 60 and the tool holder 61 will be likewise changed in direction and therefore the tool will make a motion necessary to form the undercut slot at the corner 93 where the two edges 91, 92 are to meet.

Let us say the next cutting operation is to take place along the short line 92 then the member 33 will be indexed until the point of the tool is at right angles to the line 92 and while the head is reciprocating the compound rest 9 is moved so that the tool makes a cut along this line 92. To cut the other half of the corner the member 33 may then be indexed so that the tool is directed at an angle of 45° to the line 92 and in a downward direction, whereupon the compound slide 9 is moved so that the tool cuts the left hand half of the corner 93. The two undercut portions, that is, the undercut portions which meet at the diagonal line 93 in Figure 4, completes the undercut where the lines 91 and 92 meet, or in other words, the machine will have cut out the corner which ordinarily has to be cut by hand where the work is performed on any previous type of machine.

The upper line 94 may be cut in the same manner as described in connection with the line 92 although the member 33 will be indexed to point the tool upwardly at right angles to this line with the tool pointing upwardly instead of downwardly in Figure 3. This proceeding may be followed in connection with the several straight lines or edges of the slot being formed in the piece of work, the member 33 being indexed for each corner cut in a direction and to an extent necessary to mitre the meeting edges of the several straight cuts.

If a curved cut is to be made, such as the semicircular opening 80 in Figure 4, the operator will proceed as follows: He will first make any adjustments in the slide 8 or compound slide 9, or both, necessary to bring the point of the tool in line with the dot 95 in Figure 4, which is the center of the arc of the curved edge 80. The operator will then operate the crank 77 until the point of the tool is moved by the movement of the slide 60, that is, through the operation of the crank 77 and the shaft 78, until the point of the tool is moved the extent of the radius of the curved edge 80, or in other words, until the point of the tool moves to some point on the curve 80 which is the radius of the arc of this edge. Let us say that the tool points to the bottom of this curved edge 80 which is to be formed, which is the top of the straight edge 92. The reciprocating head will be set into operation beginning, say, at the point 96 and as the head reciprocates the operator will index the member 33, gradually revolving this member as the reciprocating head makes its strokes, so that the tool, while making its up and down movements, sweeps around an arc of which the point 95 is the center; or, in other words, the tool making its vertical strokes progresses in the arc of the arcuate edge 80 so that it cuts gradually around this arc, due to the gradual indexing of the member 33. As this takes place, that is to say, as the member 33 is gradually indexed through the worm and worm gear, the post 29 is revolved with it through the key and slot 43, so that the lateral motion imparted to the tool through the rollers 42 and the slots 53 will change in accordance with the formation of the arcuate cut 80 so that the undercut 81 around this curved edge will be formed by the tool. Thus a curved slot may be formed in a piece of work by gradually revolving the member 33 so that everything can be accomplished which could be accomplished in machines having a revolving table. The present device, however, is simple and inexpensive.

It will be seen that the motion for causing the undercut angle 81 in the piece of work is varied or changed in direction in accordance with the indexing of the member 33 through the worm and worm gear. It will be apparent that a slot of any shape may be cut with the present machine.

In Figure 6 I have shown a more intricate shape to be slotted in a piece of work. The central portion of the cut out 83 is more or less rectangular. The curved edge 84 may be cut by manipulating the machine in the same manner as in cutting the edge 80 in Figure 4. To cut the slots 85 extending outwardly from the curved edge 84 the member 33 from its position after cutting the edge 84 will be indexed to bring the tool into the position to cut one of the slots 85. One of these slots may then be cut and for this purpose the crank 77 will be turned to move the point of the tool gradually from the line 84 outwardly and the member 33 will be indexed to move the tool in the direction of the width of the slot 85.

By these combined actions the slot 85 may be cut and the undercut angle 81 will be formed at the same time. The curved edge 86 at the right in Figure 6 may be cut in the same manner as the edge 84 and then to cut the rectangular extension 87 the operator may move the slides 8 and 9 to make this cut, or he may use the crank 77 for this purpose. The slides 8 and 9 may be utilized in this particular instance because the slot 87 is parallel with the direction of motion of the slide 9 and wherever a slot is to be cut which is parallel with the movement of either the slide 8 or the slide 9, these slides may be moved to accomplish the cut, whereas in the case of the slot 85 which is at an angle to the movement of both slides 8 and 9 it is necessary to operate the crank 77 and to move the slide 60 as well as to index the member 33 in order to form a slot such as 85.

From the above it will be apparent that I have provided a machine which is simple and reasonable in cost, which may be used to execute all types of slotting and which will not only provide the undercut in the piece of work but will form the undercut in the corners to eliminate handwork.

Having described my invention, what I claim is:

1. A slotting machine including a reciprocating head, a revolvable member carried by said head, a tool holder and means for mounting the same slidably on said revolvable member to permit it to have a movement laterally of the direction of movement of said head, means for reciprocating said head, means for automatically causing said tool holder to move laterally of the direction of movement of the head and simultaneously therewith, whereby a tool carried by said tool holder is caused to move through a piece of work in a diagonal direction, and means for revolving said revolvable member to change the radial direction of lateral reciprocation of said tool holder.

2. A slotting machine, including a reciprocating head, a revolvable member carried by said head, a tool holder and means for mounting the same slidably on said revolvable member to permit it to have a movement laterally of the direction of movement of said head, means for reciprocating said head, means for automatically causing the tool holder to move laterally of the direction of movement of the head and simultaneously therewith, whereby a tool carried by said tool holder is caused to move through a piece of work in a diagonal direction, and a worm and worm gear for revolving said revolvable member to change the radial direction of said lateral reciprocation of said tool holder.

3. A slotting machine, including a reciprocating head, a revolvable member carried by said head, a tool holder and means for mounting the same slidably on said revolvable member to permit it to have movement laterally of the direction of movement of said head, means for reciprocating said head, cam means for automatically causing said tool holder to move laterally of the direction of movement of the head, and simultaneously therewith, whereby a tool carried by said tool holder is caused to move through a piece of work in a diagonal direction, and means for revolving said revolvable member to change the radial direction of reciprocation of said tool holder.

4. A slotting machine, including a reciprocating head, a revolvable member carried by said head, a tool holder and means for mounting the same slidably on said revolvable member to permit it to have movement laterally of the direction of movement of said head, means for reciprocating said head, cam means for automatically causing the tool holder to move laterally of the direction of movement of the head and simultaneously therewith, whereby a tool carried by said tool holder is caused to move through a piece of work in a diagonal direction, and a worm and worm gear for revolving said revolvable member to change the radial direction of said lateral reciprocation of said tool holder.

5. A slotting machine including a reciprocating head, a member carried by said head and mounted to revolve therein around the axis of said head, a tool holder and means for mounting the same slidably on said revolvable member to permit it to have a movement laterally of the direction of movement of said head, means for reciprocating said head, means for automatically causing said tool holder to move laterally of the direction of movement of the head and simultaneously therewith, whereby a tool carried by said tool holder is caused to move through a piece of work in a diagonal direction, and means for revolving said revolvable member to change the radial direction of lateral reciprocation of said tool holder, said latter means being adapted to be operated while said head is reciprocating.

6. A slotting machine including a reciprocating head and means for causing it to move in a rectilinear direction, a revolvable member carried by said head, a tool holder and means for mounting the same slidably on said revolvable member to permit it to have a movement laterally of the direction of movement of said head, means for reciprocating said head, a member having a fixed position and cam means carried by said head and co-operating with said fixed position member to effect a lateral movement of said tool holder simultaneously with the reciprocation of said head, whereby a tool carried by said tool holder is caused to move through a piece of work in a diagonal direction.

7. A slotting machine including a reciprocating head and means for causing it to move in a rectilinear direction, a revolvable member carried by said head, a tool holder and means for mounting the same slidably on said revolvable member to permit it to have a movement laterally of the direction of movement of said head, means for reciprocating said head, a member having a fixed position and cam means carried by said head and co-operating with said fixed position member to effect a lateral movement of said tool holder simultaneously with the reciprocation of said head, whereby a tool carried by said tool holder is caused to move through a piece of work in a diagonal direction, and means for revolving said revolvable member to change the radial direction of lateral reciprocation of said tool holder.

8. A slotting machine including a reciprocating head and means for causing it to move in a rectilinear direction, a tool holder and means for mounting the same on said head to have a lateral rectilinear, sliding motion in relation to the head and to reciprocate with the head, a member having a fixed position, cam means co-operating therewith to effect the lateral movement of said tool holder simultaneously with the reciprocation of said head, whereby a tool held in said tool holder will be caused to move through a piece of work in a diagonal direction, and means for adjusting the extent of lateral movement of said tool holder to vary the angle of cut of the tool.

9. A slotting machine including a reciprocating head, a revolvable member carried by said head, a tool holder and means for mounting the same slidably on said revolvable member to permit it to have a movement laterally of the direction of movement of said head, means for reciprocating said head, means for automatically causing said tool holder to move laterally of the movement of the head and simultaneously therewith, whereby a tool carried by said tool holder is caused to move through a piece of work in a diagonal direction, means for revolving said revolvable member to change the radial direction of lateral reciprocation of said tool holder, and means for adjusting the extent of the lateral movement of said tool holder to vary the angle of cut of the tool.

10. A slotting machine including a reciprocating head, a revolvable member having a fixed position, a revolvable member carried by said head and adapted to revolve said fixed position member therewith, a tool holder and means for slidably mounting the same on said revolvable member to have movement laterally of the direction of movement of said head, means co-operating with said fixed position member for causing the lateral movement of said tool holder simultaneously with the reciprocation of said head, whereby a tool carried by said tool holder is caused to move through a piece of work in a diagonal direction.

11. A slotting machine including a reciprocating head, a revolvable member having a fixed position, a revolvable member carried by said head and adapted to revolve said fixed position member therewith, a tool holder and means for slidably mounting the same on said revolvable member to have movement laterally of the direction of movement of said head, means co-operating with said fixed position member for causing the lateral movement of said tool holder simultaneously with the reciprocation of said head, whereby a tool carried by said tool holder is caused to move through a piece of work in a diagonal direction, and means for revolving said revolvable member to change the radial direction of the lateral movement of said tool holder.

12. A slotting machine including a reciprocating head, a revolvable member having a fixed position, a revolvable member carried by said head and adapted to revolve said fixed position member therewith, said second revolvable member being tapered and fitting a tapered opening in said reciprocating head, a tool holder and means for slidably mounting the same on said second revolvable member to have movement laterally of the direction of movement of said head, means co-operating with said fixed position member for causing the lateral movement of said tool holder simultaneously with the reciprocation of said head whereby a tool carried by said tool holder is caused to move through a piece of work in a diagonal direction.

13. A slotting machine including a reciprocating head, a post having a fixed position but mounted to revolve, a revolvable member carried by said head and adapted to revolve said post but to reciprocate in relation thereto, a tool holder, a slide for carrying said tool holder and mounted to reciprocate with said head and to slide laterally of the direction of movement of said head, a roller carried by said post, and a cam member carried by said slide and engaging said roller and adapted to effect the lateral reciprocation of said slide simultaneously with the reciprocation of said head.

14. A slotting machine including a reciprocating head, a post having a fixed position and mounted to revolve, a revolvable member carried by said head and adapted to revolve said post but to reciprocate in relation thereto, a tool holder, a slide for carrying said tool holder and mounted to reciprocate with said head and to slide laterally of the direction of movement of said head, a roller carried by said post, and a cam member carried by said slide and engaging said roller and adapted to effect the lateral reciprocation of said slide simultaneously with the reciprocation of said head, and means for revolving said revolvable members to vary the radial angle of lateral movement of said tool holder.

15. A slotting machine including a reciprocating head, a revolvable member carried by said head, a slide carried by said revolvable member and arranged to reciprocate laterally of the axis of said revolvable member, a second slide carried by said revolvable member, a tool holder carried by said second slide, means for reciprocating said first slide, said second slide adapted to be moved with said first slide, means for adjusting the position of said second slide in relation to said first slide to vary the position of the tool holder, and means for revolving said revolvable member to vary the radial angle of lateral movement of said tool holder.

16. A slotting machine including a reciprocating head, a revolvable member carried by said head, a block carried by said revolvable member, a slide slidably movable in said block in a direction laterally of the direction of movement of said head, means for reciprocating said slide simultaneously with the reciprocating movement of the head, said block having a dovetail groove, a second slide movable therein and means connecting said slide with said first slide, another slide having a portion engaging the dovetail groove of said block, means for adjusting the position of said last mentioned slide in relation to said second mentioned slide, and a tool holder carried by said third mentioned slide.

17. A slotting machine including a reciprocating head, a member having a fixed position and mounted to revolve, a revolvable member carried by said head, a slide co-operating with said revolvable member and arranged to slide laterally of the direction of movement of said head, cam means associated with said slide and co-operating with said fixed position member to cause a lateral reciprocation of said slide simultaneously with the reciprocation of said head, a second slide, carrying a tool holder and an adjustable cam plate associated with said first slide, and means co-operating therewith whereby said first slide causes a reciprocation of said second mentioned slide.

18. A slotting machine including a reciprocating head and means for reciprocating it, a revolvable member carried by said head, a slide co-operating with said revolvable member and arranged to reciprocate laterally of the direction of movement of said head, and means for moving said slide, a second slide carrying a tool holder, a pivotal cam plate connected with said first slide, and means associated with said second slide co-operating with said cam plate, said cam plate being adjustable on different sides of a neutral point and to different degrees to vary the direction and extent of movement of said second slide by said first slide.

19. A slotting machine, including a reciprocating head, means for causing it to move in a rectilinear direction, a tool holder mounted on said head, means for causing it to have lateral, rectilinear, sliding movement only in relation to said head, means for reciprocating said head and means for automatically causing said tool holder to slide laterally as the head reciprocates, whereby a tool in said tool holder is caused to move through a piece of work in a diagonal direction.

20. A slotting machine, including a reciprocating head, means for causing it to move in a rectilinear direction, a tool holder mounted on and carried by said head, means for causing the tool holder to have lateral, rectilinear, sliding movement only in relation to said head, means for reciprocating said head and means for automatically causing said tool holder to slide laterally as the head reciprocates, whereby a tool in said tool holder is caused to move through a piece of work in a diagonal direction.

21. A slotting machine, including a reciprocating head, means for causing it to move in a rectilinear direction, a tool holder mounted on and carried by said head, means for causing the tool holder to have lateral, rectilinear, sliding movement only in relation to said head, means for reciprocating said head, and cam means for automatically causing said tool holder to slide laterally as the head reciprocates, whereby a tool in said tool holder is caused to move through a piece of work in a diagonal direction.

22. A slotting machine, including a stationary support, a reciprocating head, means for causing said head to move in a vertical, rectilinear direction in relation to said support, an eccentric for reciprocating said head, a tool holder mounted on and carried by said head, means for causing the tool holder to have lateral, rectilinear, sliding movement only in relation to said head and means for automatically causing said tool holder to slide laterally as the head reciprocates whereby a tool in said tool holder is caused to move through a piece of work in a diagonal direction.

23. A slotting machine, including a reciprocating head, means for causing said head to move in a rectilinear direction, a tool holder mounted on and carried by said head, means for causing the tool holder to have lateral, rectilinear sliding movement only in relation to said head while reciprocating with said head, a member having a fixed position, and cam means co-operating therewith to effect a lateral movement of said tool holder simultaneously with the reciprocation of said head, whereby a tool held in said tool holder will be caused to move through a piece of work in a diagonal direction.

LOUIS G. LARSEN.